United States Patent [19]
Bayley et al.

[11] 3,818,089
[45] June 18, 1974

[54] FAT ABSORPTION INDICATOR FOR THE DIGESTIVE TRACT

[75] Inventors: Henry S. Bayley, Guelph, Ontario; Walter E. Carlson, Fort Saskatchewan, Alberta, both of Canada

[73] Assignee: Canadian Patents and Development Limited, Ottawa, Ontario, Canada

[22] Filed: Jan. 18, 1971

[21] Appl. No.: 107,562

[52] U.S. Cl. ................................. 424/9, 424/343
[51] Int. Cl.... G01n 5/02, G01n 31/06, G01n 33/02
[58] Field of Search ............................... 424/9, 343

[56] References Cited
OTHER PUBLICATIONS
Baumann et al., J. Organ. Chem., Vol. 31, 1966, pp. 498–500.

Primary Examiner—Albert T. Meyers
Assistant Examiner—A. P. Fagelson
Attorney, Agent, or Firm—Stevens, Davis, Miller and Mosher

[57] ABSTRACT

As a fat absorption indicator for determining fat absorption during its passage through the digestive tract, a fully etherified, fat soluble, polyalkyl polyol, particularly trialkyl glyceryl ethers, and preferably tridodecyl-glyceryl ether, is administered in a dietary feed composition containing a fat.

9 Claims, No Drawings

FAT ABSORPTION INDICATOR FOR THE DIGESTIVE TRACT

The present invention relates to a fat absorption indicator for use in determining the absorption of dietary fat in the digestive tract of animals, for example, man, non-human mammals and avians during passage of a dietary feed composition containing such fat and said indicator through said digestive tract. In particular, the present invention relates to a dietary fat containing composition also containing said fat absorption indicator and a method of determining the fat absorption by at least a portion of the digestive tract including the stomach, jejunum, ileum, cecum and colon employing said indicator in the dietary feed composition fed to the animal.

The determination of fat absorption is normally performed in studies involving all species of animals including man. The main purpose of the determinations is to measure the extent to which dietary fat is absorbed from the gastrointestinal tract. These studies may be necessitated by inquiry into the measurement of the availability of fat under different dietary conditions or by clinical studies which examine digestive malfunctions such as steatorrhea. For example a new born mammal normally depends on its dam for readily available food. However, for some domestic animals, e.g., the pig it is desirable to wean the animal at an early age in order to increase the efficiency of production. The baby pig has difficulty in digesting fats other that that which is in the dam's milk. Studies of fat digestibility in early weaned pigs have yielded inconsistent and conflicting results and thus there is a need for more detailed information concerning the process of absorption of fat from the digestive tract.

Fat absorption may be measured indirectly by comparing the amount of fat ingested with the amount excreted in the feces and the amount absorbed is calculated from the difference between these two values. However, present methods of fat absorption using total balance are tedious and difficult and in particular it is difficult to make a total collection of feces corresponding exactly to the amount of ingested feed. Further such total balance methods cannot be used in experimental conditions which employ animals with fistulated digestive tracts, or intubation techniques.

For an improvement in the total balance methods an unabsorbed inert material is often incorporated in the dietary feed as indicator to measure fat absorption. This obviates the need for a total collection of feces as only a representative sample of excreta is required. The amount of fat absorbed is calculated from the ratio of fat ($F$) to indicator ($I$) in the feed and in the feces by the equation fat absorbed equals $$\text{Fat absorbed} = F/I \text{ (feed)} - F/R \text{ (feces)}/F/I \text{ (feed)} \times \text{fat ingested.}$$

A number of different compounds have been used as fat absorption indicators, some of which are inert materials such as chromic oxide and copper thiocyanate and some are water soluble such as polyethylene glycol and phenol red. There has been a limited use of lipid soluble compounds such as cholesterol and a silicone vacuum pump fluid and radioactive labeling has also been used to measure fat absorption. However, the fat absorption indicators in current use while being generally satisfactory for the determination of fat absorption by comparing feed intake with fecal output, do not allow simple quantitative measurement of the fat absorption from samples of digesta taken from different regions of the digestive tract.

The measurement of the fat absorbed by comparing the fat in the feces to fat absorbed using fat absorption indicators are subject to substantial disadvantages in that inter alia the feces besides containing fat of exogenous origin, i.e., unabsorbed residues of the dietary fat, also contain fat of endogenous origin, i.e., fat not derived directly from the dietary fat but inter alia includes fat secretion into the degestive tract and desquamation of the mucosal cells and synthesis by microflora. The amount of endogenous fat is usually estimation by feeding a fat free diet and measuring the fat voided into the feces. A comparison of the amount of fat ingested and the amount of fat voided in the feces gives apparent fat absorption values and the fecal fat of endogenous origin must be subtracted from the total fecal fat in the calculation of corrected fat absorption values. Further, the microflora in the lower gut does more than simply make an addition of the amount of endogenous fat. Unsaturated fatty acids which are not absorbed are extensively hydrogenated and the microflora synthesizes lipids which contain large amounts of odd carbon number, branched and long chain fatty acids. As a result the coefficient of absorption that are calculated using fecal samples are low for saturated fatty acids and high for unsaturated fatty acids. Thus fatty acids found at the end of the ileum, the point in the digestive tract where absorption of fatty acids may by considered complete, are quite different from those found in the feces. Thus it is important in fat absorption studies to use ingesta samples taken from the digestive tract, particularly ileal samples because modifications of the lipid fraction by intestinal microorganisms are minimal under most circumstances. In general, therefore, studies of fat absorption using ingesta from the intestinal tract give superior results than studies using the feces.

As aforesaid, the absorption indicators in current use while generally satisfactory for the determination of digestibility by comparing feed intake with fecal output, do not allow a simple and easy quantitative measurement of the fat absorption of samples of the digesta taken from different regions of the digestive tract. Of the indicators, chromic oxide is the most commonly used lipid-insoluble inert indicator and is quite adequate in most cases where a balance of feed and feces is being considered. However, there have been reports of diurnal variation in the excretion of chromic oxide by pigs and a variation between fecal samples from man, possibly due to the indicator becoming separated from the rest of the digesta and thus transported at different rates that some of the other components of the digesta (this particularly applies to the fat). Further attempts to measure the progress of the fat absorption from a dietary composition as for example 10 percent corn oil, lard or tallow in a semi-synthetic diet along the length of the digestive tract of pigs using chromic oxide as indicator gives results which could not be quantitated because of the separation of the chromic oxide from the dietary fat in the stomach of the pigs. Thus, fat is retained in the stomach longer than the chromic oxide indicator resulting in a larger ratio of fat to chromate making it difficult to calculate meaningful absorption coefficients for any section of the digestive tract. Further estimation of chromium is relatively complex.

Reports have been made of the estimation of fat excretion in feces using cuprous thiocyanate as an indicator, but like chromic oxide, copper thiocyanate is an inert particulate compound and is believed to separate from the fat in the stomach in the same way that chromic oxide does and the only advantage that cuprous thiocyanate has over chromic oxide as a fat absorption indicator is the ease with which the copper can be determined as compared to chromium.

Water soluble but lipid insoluble unabsorbed indicators such as polyethylene glycol and phenol red have also been investigated. Analysis of samples of gastric contents and of intestinal contents by intubation gives a large discrepancy between the ratio of fat to indicator in the stomach contents and in the test diets and it was concluded that the results from intubations into the small intestine are meaningless because of the large separation of fat and water soluble indicator that occurs in the stomach. Thus the criteria for an ideal fat absorption indicator for use in fat absorption studies are as follows: (1) it should not be absorbed in the degestive tract, (2) it should remain homogeneously mixed with a dietary fat throughout the digestive tract, (3) it should be non-toxic, (4) it should not interfere with the normal process of digestion or absorption, (5) it should be inert to chemical change throughout the entire digestive tract and (6) it should be easily and accurately determined quantitatively. Clearly, inert particulate lipid insoluble or water soluble indicators do not satisfy these criteria for an ideal fat absorption indicator and a lipid soluble indicator is particularly desirable when fat absorption from the intestine is determined using ingester samples from the gastrointestinal tract. Tests have been made to find a suitable lipid soluble compound for use as a fat absorption indicator and cholesterol has been suggested due to its low digestibility and DC silicone fluid 703 a vacuum pump fluid has also been suggested as a fat absorption indicator on the basis that it is unabsorbed. However, neither of the compounds are ideal in that cholesterol is absorbed in varying amounts and may affect the normal process of absorption while quantitative estimation of silicone fluid involves a very complex procedure and thus as lipid soluble fat absorption indicators they are not satisfactory.

The present invention provides a fat absorption indicator which is lipid soluble and which satisfies all the criteria set forth above and thus is highly suitable as a fat absorption indicator in fat absorption determinations with respect to any portion of the digestive tract.

It has now been found according to the present invention that a fully etherified polyalkylether of a polyol which is lipid soluble is highly useful as a fat absorption indicator and is easily and accurately determined quantitatively.

According to the present invention therefore there is provided in the determination of the fat absorption of at least a portion of the digestive tract of an animal which comprises feeding to the animal a dietary feed composition containing a fat and a fat absorption indicator and determining the residual fat content of the feed from a selected portion of the digestive tract, the improvement in which the indicator is a lipid soluble, fully etherified polyalkyl polyol.

The present invention also includes a dietary feed composition for use in determining the fat absorption during its passage through the digestive tract in an animal, said composition containing a fat and a fully etherified fat soluble polyalkyl ether of a polyol as absorption indicator.

The polyalkyl polyol must be fully etherified as any free hydroxyl groups present in the indicator would be available for esterification and thus the compound would be subject to modification. Further, the fully etherified polyalkyl polyol must be lipid soluble and should desirably have a melting point below body temperature which is normally 37°C. and more preferably below 20°C. which would make the polyether liquid at room temperature and would facilitate mixing in oils and fat for the measurement of fat absorption. Within these criteria, the alkyl chain length and the particular polyol used is not critical, but preferably the ether is a glyceryl ether of the formula

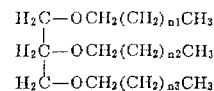

suitably present in an amount up to about 5% by weight and preferably up to about 1% by weight of the fat wherein $n_1$, $n_2$ and $n_3$ are integers, suitably of at least 8. The most preferred ether is tridodecyl glyceryl ether which has a melting point below 37°C., is readily fat soluble, is non-toxic, does not interfere with the normal process of digestion or absorption and is inert to chemical change throughout the entire digestive tract and is equally easily and accurately determined quantitatively.

The fully etherified polyalkyl polyol for use as fat absorption indicators in the present invention are generally known compounds and have been reported for example, by Baumann and Mangold, Journal of Organic Chemistry (1966) 31 pp. 498–500. Trialkylglyceryl ethers are however desirably synthesized by the method of Palthauf and Spener, Chem. Phys. Lipids 2 (1968), pp. 168-172, which method involves the use of 3-tetrahydropyranyl glyceryl and alkylmethanesulfonates. The 3-tetrahydropyranyl glycerolma be prepared according to the method of Barry and Craig, Canadian J. Chem. 33 (1955) pp. 716–721 and the methanesulfonate by the method of Baumann and Mangold, J. of Organic Chem. (1964) 29 pp. 3,055 – 3057. The tetrahydropyranyl group prevents the third oxygen atom of the glycerol moiety from combining with the alkyl moiety and makes the two other oxygens more reactive. In subsequent stages of the synthesis, the tetrahydropyranyl group is readily cleaved with acid and the third oxygen atom then readily forms an ether linkage when reacted with alkyl methanesulfonate.

In the process of the present invention, the determination i.e., the quantitation of the tridodecyl glyceryl ether in the sample, e.g., the ingesta sample, involves three simple steps, namely the extraction from the example to be analyzed, the addition of an internal standard, the separation of the lipids using thin-layer chromatography and the separation or quantitation by gas-liquid chromatography. In particular the digesta or feces may be lyophilized and ground and an appropriate quantity of the dried material, usually 2 gm or less, is subjected to fat extraction procedures (Method B of van de Kamer et al. J. biol. Chem. (1949) 177 pp. 347–355 as modified by Braddock et al., Gastroenterology (1968) 55 pp. 165-172.) An aliquot of the lipid extract is subjected to separation by thin layer chromatography and quantitation by gas-liquid chromatography using an internal standard which obviates the need for quantitative transfer. In particular with tridodecyl glyceryl ether, the internal standard used may be 1,2-didodecyl-3-tetradecyl glyceryl ether which is added to the aliquot and the ethers separated from the lipids using, as aforesaid, thin-layer chromatography. The triethers are eluted from the thin-layer plates and separated using gas-liquid chromatography. Routinely, separation by thin-layer chromatography and quantitation by gas-liquid chromatography is rapid and simple.

The present invention will be further illustrated by way of the following examples. Example 1 showing the preparation of the indicator and Examples 2 and 3 its use as fat absorption indicator with chromic oxide as control.

EXAMPLE 1 a. Preparation of 3-tetrahydropyranyl glyceryl ether

Concentrated hydrochloric acid (10 drops) was added cautiously to allyl alcohol (86 g) and 3,4-dihydropyran (128 g.) and the mixture was immediately placed under a condensor and left there to cool. The mixture was stirred overnight and then neutralized with excess sodium bicarbonate and the allyl tetrahydropyranyl ether was distilled from the mixture at 165°–167°C.

Allyl tetrahydropyranyl ether (75 g) was mixed with water (335 ml) in a 3,000 ml beaker which was set in an ice bath and cooled to 5° ± 1°C. After this addition, the mixture was allowed to stand for an additional two hours in the cold water bath and was then heated on a steam bath for one hour. The hot solution was filtered, cooled to room temperature and saturated with potassium carbonate. The ether separated as an oil. The two phases were separated in a separatory funnel and the ether was dissolved in diethyl ether and dried over potassium carbonate. The solution was transferred to a flask and the solvent removed using a rotary evaporator. The 3-tetrahydropyranyl glyceryl ether was distilled from the residue at 146°–149°C. at 4 mm. pressure and was stored without additional purification.

b. Preparation of the methanesulfonates (mesylates)

Alcohol, either dodecanol or tetradecanol, (430 m moles) was added to absolute pyridine (400 ml) in a 2,000 ml reaction flash equipped with a dropping funnel. The flask was cooled in an ice bath and stirred continuously while methanesulfonyl chloride (75 g) was added, dropwise, over a 2 hour period. After the addition, the flask was removed from the ice bath and was stirred at room temperature for 3 hours. The resulting slurry was dissolved in water (750 ml) and diethyl ether (1,000 ml) and transferred to a separatory funnel. The aqueous phase was separated and kept in an ice bath while the ethereal phase was washed consecutively with water (250 ml), 2 N sulfuric acid (until acidic), water (250 ml), 1 percent potassium carbonate solution (until basic) and water (250 ml). The ethereal phase was then dried over anhydrous sodium sulfate. The original water phase and the other basic water phases were combined and extracted with diethyl ether (1,000 ml). This ethereal phase was then washed with water (250 ml) and used to extract the acidic water phases; after which it was washed with water (250 ml) and then dried together with the original ethereal phase. The dried combined ethereal phases were transferred to a flask and the solvent was removed using a rotary evaporator. The residue was crystallized from absolute ethanol at 4°C. The mesylate crystals were recovered by filtration using a chilled Buchner funnel in a cold room at 4°C. and were recrystallized twice from absolute ethanol before storing at 4°C.

c. Preparation of 1,2-didodecyl glyceryl ether (1,2-didodecoxypropane)

Potassium hydroxide pellets (30 g) and 3-tetrahydropyranyl glyceryl ether (8.8 g) were added to dry benzene (800 ml) in a 2,000 ml reaction flask equipped with a water separator and a dropping funnel. The reaction mixture was refluxed and stirred. Dry benzene (200 ml) was added after 2 and 4 hours of the reaction and refluxing was continued for 20 hours, then dodecyl methanesulfonate (40 g) in 100 ml of benzene was added dropwise through the dropping funnel over a 4 hour period while the refluxing and stirring continued. After the addition of the mesylate was complete, refluxing and stirring continued for another 48 hours, then the reaction mixture was cooled and transferred with water (1,000 ml) and diethyl ether (1,000 ml) to a 4,000 ml Erlynmeyer flask. The two phases were separated in a 3,000 ml separatory funnel and the water phase was washed with two portions of diethyl ether (400 ml). The organic phases were combined, washed with water until neutral and then dried over anhydrous sodium sulphate. The solution was transferred to a flask and the solvent was removed using a rotary evaporator. The oily residue was dissolved in diethyl ether (100 ml) and methanol (150 ml), concentrated hydrochloric acid (5 ml) was added and the mixture was well blended. The crystalline precipitate that formed at 4°C. was collected on a Buchner funnel at the same temperature and then recrystallized from ethanol before using it in the synthesis of the triether.

d. Preparation of 1,2,3-tridodecyl glyceryl ether (1,2,3-tridodecoxypropane)

Didodecyl glyceryl ether (7 g) and potassium hydroxide pellets (12 g) were added to dry benzene (500 ml) in a 2,000 ml reaction flask equipped with a water separator and a dropping funnel. This reaction mixture was refluxed and stirred for 18 hours, then dodecyl methanesulfonate (20 g) dissolved in 100 ml of benzene was added dropwise over a 2 hour period. The mixture was allowed to reflux and was stirred with the water separator in place for 72 hours, then 300 to 400 ml of benzene were distilled off and the oily residue was chilled in an ice bath and diethyl ether (200 ml) and water (400 ml) were added slowly. The aqueous and ethereal phases were separated in a separatory funnel. The aqueous phase was washed twice with diethyl ether (200 ml) and these washings were combined with the original ethereal phase and washed with water until neutral. The ether solution was dried over anhydrous sodium sulphate before it was transferred to a flask and the solvent was removed using a rotary evaporator. The residue was crystallized from absolute ethanol (400 ml) and recovered on a chilled Buchner funnel at 4°C. The further purification of the tridodecyl glyceryl ether, using a silica gel column, is described in a subsequent section.

e. Preparation of 1,2-didodecyl, 3-tetradecyl glyceryl ether (1,2-didodecoxy, 3-tetradeoxypropane)

Didodecyl, tetradecyl glyceryl ether was used as an internal standard for the quantitation of the tridodecyl glyceryl ether by gas-liquid chromatography. The preparation of 1,2-didodecyl, 3-tetradecyl glyceryl ether from 1,2-didodecyl glyceryl ether followed the same procedure as for the synthesis of 1,2,3-tridodecyl glyceryl ether, except that tetradecyl methanesulfonate was used instead of the dodecyl mesylate.

f. Purification of trialkyl glyceryl ethers

Crude samples of tridodecyl glyceryl ether were dissolved in 20 volumes of ethanol and were allowed to crystallize overnight at 4°C. Ethanol was used because it is a polar solvent and the nonpolar triether crystallized from it more easily than any polar contaminants. This preliminary purification step increased the amount of pure triether that could be obtained from each sample fractionated on a silica gel column. Two large glass columns were used: one column, 150 × 4 and the second, 150 × 7.5 cm. They were packed with 1 kg and 3 kg, respectively, of 28–200 mesh silica gel. The columns were prepared by eluting them with anhydrous diethyl ether followed by hexane and then the samples of recrystallized crude triether (1% of the silica gel by weight) were applied, dissolved in a small volume of hexane. Elution of the columns with hexane (5 liters on the 150 × 4 cm column and 15 liters on the 150 × 7.5 cm column) removed the simple ROR dodecyl ether, then elution with 4 percent anhydrous diethyl ether in hexane (15 liters on the 150 × 4 cm column and 45 liters on the 150 × 7.5 cm column) eluted the triether.

The fractions containing triether were pooled and the solvent was removed under reduced pressure on a rotary evaporator.

EXAMPLE 2

Determination of fat digestibility in the rat using either a balance of feed intake and feces output or indicators of digestibility (i.e., chromium sesquioxide or tridodecyl glyceryl ether) and studies of the process of fat absorption through the digestive tract.

Fifteen, 200 g male rats were housed in individual cages which allowed the measurement of feed intake and the separation and collection of urine and feces. Each rat received 16 g of feed per day (80 percent of the ad libitum intake) and all feces voided from the 5th–15th day after the rats had received the diet were collected, frozen, lyophilized and weighed. The diet consisted of corn starch, cerelose, cellulose, a soybean protein concentrate, and contained adequate levels of vitamins and minerals; 10 percent of beef tallow, 0.1% tridodecyl glyceryl ether, and 0.25 percent chromium sesquioxide were added to the diet.

At the end of the collection period, the rats were sacrificed 3 hours after receiving a meal and the contents of the stomach, middle 20 percent of the small intestine (jejunum), distal 20 percent of the small intestine (ileum), cecum and colon were removed, frozen and transferred to flasks for saponification. Total fatty acids, TGE and chromic oxide concentrations in the diet, digesta samples, and feces were determined by the methods as set forth hereafter.

Results

TABLE 1

Recovery of dietary TGE and chromic oxide in the feces of rats, and apparent dat indigestibilities calculated using both indicators and total collection.

|  | Total collection | Chromic oxide | TGE |
|---|---|---|---|
| Recovery (% of dietary intake recovered in feces) | — | 97 ± 2[a] | 98 ± 2 |
| Apparent fat digestibility (%) | 73[b]± 2.5 | 73[c]± 2.7 | 73[c]± 2.2 | a standard deviation of mean (15 observations per mean)

b calculated from the expression:
$$\frac{\text{g fat intake in diet} - \text{g fat voided in feces}}{\text{g fat intake in diet}} \times 100$$

c calculated from the expression:
$$\frac{F/I \text{ (feed)} - F/I \text{ (feces)}}{F/I \text{ (feed)}} \times 100$$
where F is concentration of fatty acid and I is concentration of indicator.

The recovery of the two indicators is shown in Table 1; the almost complete recovery of the dietary intake of both indicators shows that neither compound is absorbed or digested in passing through the digestive tract, and this establishes their suitability as indicators of digestibility. From the relative concentrations of a nutrient (such as fat) and the indicator in the feed and feces the digestibility of the nutrient can be calculated. These are shown for the total fatty acids in Table 1, the value determined by direct comparison of the amounts of fatty acid consumed in the diet with the amount voided in the feces agree well with those determined using either of the two indicators. Thus both chromic oxide and TGE are equally useful as indicators of fatty acid digestibility; the use of either indicator eliminates the need for tedious measurement of feed intake and careful collection of total feces output. The use of the TGE indicator requires less analytical work to measure fat digestibility than that needed when chromic oxide is employed as indicator.

TABLE 2

Apparent absorbabilites of total fatty acids calculated from the relative concentrations of fatty acid and indicator, in the diet and in samples of digesta removed from different regions of the digestive tract. Values calculated using either chromic oxide or TGE as indicators.

|  | Apparent absorbabilities of dietary total fatty acids (%)[a] | |
|---|---|---|
|  | chromic oxide | TGE |
| Stomach | − 88 ± 15[b] | 16 ± 8 |
| Jejunum | 16 ± 29 | 67 ± 9 |
| Ileum | 80 ± 7 | 91 ± 1 |
| Cecum | 81 ± 4 | 93 ± 1 |
| Colon | 80 ± 14 | 88 ± 6 |

TABLE 2—Continued

Apparent absorbabilites of total fatty acids calculated from the relative concentrations of fatty acid and indicator, in the diet and in samples of digesta removed from different regions of the digestive tract. Values calculated using either chromic oxide or TGE as indicators.

| | Apparent absorbabilities of dietary total fatty acids (%)[a] | |
|---|---|---|
| | chromic oxide | TGE |

[a] calculated from the expression:
$$\frac{F/I \text{ (feed)} - F/I \text{ (digesta sample)}}{F/I \text{ (feed)}} \times 100$$
where F is concentration of fatty acid and I is concentration of indicator.

[b] standard deviation of mean (15 observations per mean).

It is often of interest to study the progress of fat absorption as the digesta passes through the digestive tract, using samples obtained by intubation, through fistulae, or by sacrificing the animals. The apparent absorbabilities of the fatty acids determined for samples of digesta taken from different positions in the digestive track are shown in Table 2. Use of chromic oxide as indicator gives unsatisfactory results because the chromic oxide moves out of the stomach faster than the fat, hence the apparent negative absorbability of fat in the stomach, and the low apparent value in the jejunum. In contrast, the TGE being lipid soluble, remains in association with the lipid phase and the absorbabilities calculated using this indicator show that little absorption occurs in the stomach with maximum apparent absorbability occurring at the end of the small intestine. The tendency for the absorbability to appear lower for the samples removed from the colon than from those taken from the cecum or ileum may be due to the addition of 'endogenous' lipid to the digesta in this region by the microflora.

The lower degree of variation associated with the use of TGE than with the chromic oxide is of significant advantage.

It will be seen from Tables 1 and 2 that the TGE appears to be equal to the well established chromic oxide as an indicator of fatty acid digestibility and has the advantage that it is more easily determined. In addition, if it were to be used in clinical studies diets containing this indicator would have a normal appearance whilst those containing chromic oxide have a dark green color. A major advantage of the TGE is that it can be used in studies of the progress of fat absorption through the digestive tract and this is the only indicator which can be used for the purpose without the application of ill-defined correction factors.

EXAMPLE 3

The use of tridodecyl glyceryl ether as a fat absorption indicator in studies of the digestion of individual fatty acids in the young pig.

Sixteen piglets were housed in individual cages which allowed the measurement of feed intake and the separation and collection of urine and feces. The two diets used consisted of corn starch, cerelose, cellulose, a soybean protein concentrate and contained adequate levels of vitamins and minerals; 0.1 percent tridodecyl glyceryl ether (TGE) and 0.25 percent chromium sesquioxide was added to the diets as absorbability indicators. One diet contained 10 percent beef tallow whilst the other was essentially fat-free, each diet was fed to 8 piglets from weaning at 7 days of age and between the 13th and 23rd days, of age the feed consumed was recorded and the feces voided were collected, frozen, lyophilized and weighed. At the end of the collection period the piglets were killed and the contents of the stomach, mid 20 percent of the small intestine (jejunum), distal 20 percent of the small intestine (ileum) and the proximal colon were froxen and lyophilized. Total fatty acids, TGE and chromic oxide concentrations in the diet, feces and digesta samples were determined by the methods as set forth hereafter.

Results

TABLE 3

Apparent absorbabilities of total fatty acids calculated from the relative concentrations of fatty acid and indicator in the diet and in samples of digesta removed from different regions of the digestive tract, and apparent digestibilities of total fatty acids. Values calculated using either chromic oxide or TGE as indicator.

| | Apparent absorbabilities of dietary total fatty acids (%)[a] | |
|---|---|---|
| | chromic oxide | TGE |
| Stomach | −32 ± 14[b] | 1 ± 21 |
| Jejunum | 0 ± 54 | 31 ± 20 |
| Ileum | 49 ± 23 | 63 ± 13 |
| Colon | 54 ± 13 | 64 ± 10 |
| Feces | 46 ± 15 | 48 ± 17 |

[a] calculated from the expression:
$$\frac{F/I \text{ (feed)} - F/I \text{ (digesta or fecal sample)}}{F/I \text{ (feed)}} \times 100$$
where F is concentration of fatty acid and I is concentration of indicator

[b] standard deviation of mean (8 observations per mean)

The apparent absorbabilities of the dietary fatty acids calculated from analyses of feed and feces were the same when either chromic oxide or TGE was used as absorption indicator, (Table 1). In contrast, the progress of digestion indicated by analysis of samples taken from the digestive tract showed very different patterns when the two indicators were used: the chromic oxide moved out of the stomach faster than the fatty acids and thus using the chromic oxide to indicate the progress of fat absorption resulted in an apparent negative absorption from the stomach, and lower absorption from the jejunum and ileum than that shown by use of the TGE as indicator. The lower absorbability of the total fatty acids in the feces than in the colon calculated from the ratios of fatty acid and TGE concentrations suggests considerable addition of fatty acid of endogenous origin to the digesta in the lower part of the digestive tract.

TABLE 4

The amount of fatty acid in 100 g of feed, in the ileal digesta or feces derived from 100 g of feed. Calculated on the basis of the relative concentrations of fatty acid and TGE in the feed, ileal digesta and feces.

|  | Low fat diet | | | High fat diet | | |
|---|---|---|---|---|---|---|
|  | Feed | Ileal digesta | Feces | Feed | Ileal digesta | Feces |
| Total fatty acid (mg) | 430 | 320 | 520 | 10,600 | 4,000 | 5,220 |
| Stearic acid (mg) | 86 | 57 | 136 | 2,170 | 1,360 | 2,510 |
| Oleic acid (mg) | 206 | 93 | 77 | 2,810 | 990 | 890 |
| Linoleic acid (mg) | 3 | 64 | 25 | 890 | 110 | 50 |
| Linolenic acid (mg) | 2 | 11 | 11 | 270 | 30 | 30 |

Calculation of the amounts of fatty acid in a given quantity of feed (i.e., 100 g) as the digesta derived from the feed passes through the digestive tract to be finally voided as feces provides information of great nutritional significance - such a calculation is shown in Table 4 for the piglet receiving the low and high fat diets. The low quantity of total fatty acid in the ileal digesta illustrates the extent of absorption, and the greater amount of fatty acid in the feces than in the ileal digesta illustrates the extent of dilution of the unabsorbed fatty acids by those of endogenous origin, which occurs in the lower part of the digestive tract.

Separation of the individual fatty acids permits similar comparisons to be made for each fatty acid and these are shown for the 18-carbon atom fatty acids. It is clear that there is some absorption of stearic acid in the small intestine, but that the overall digestibility of this acid is negative, since a greater quantity was voided in the feces than was consumed in the diet. There was no corresponding increase in the amounts of the unsaturated fatty acids, when the ileal digesta and the feces were compared indicating that the endogenous production of 18-carbon atom fatty acid in the lower part of the digestive tract is predominently of saturated acid.

The differential utilization of the saturated and unsaturated fatty acids obtained by comparison of dietary intake and fecal outputs suggest that either the saturated fatty acids are poorly absorbed or that there may be extensive hydrogenation of the unsaturated fatty acids. To clarify this question, the inventors sacrificed piglets and examined the fatty acid composition of digesta samples, but were unable to obtain quantitative information concerning the amounts of each fatty acid in the digesta which were derived from a particular amount of feed, because of the separation of the fat and chromic oxide which occurred in the stomach.

The use of the TGE as an indicator allows such quantitative information to be obtained and if it were used in conjunction with specifically labeled fatty acids could give definitive answers to the question of the utilization of different types of fats by various animals when the fats are fed in several types of diets. Such investigations are routinely carried out by fat and food processors.

In Examples 2 and 3 the fat was extracted from the feed, feces and digesta as follows:

The sample to be extracted (usually 2 g or less) was added to 10 ml potassium hydroxide in water 33 percent in a 125 ml boiling flask, 95 percent ethanol containing 0.4 percent amyl alcohol (40 ml) was added and the mixture was refluxed for 20 minutes, cooled, evaporated and 3N hydrochloric acid (17 ml) and water (10 ml) was added. The mixture was again allowed to cool and petroleum ether (exactly 50 ml) was added, the flask was shaken vigourously for 2 minutes, allowed to separate and then exactly 25 ml of the upper phase was pressured off into a pipette. This aliquot was added to a tared 50 ml beaker, evaporated, dried in a vacuum oven at 60°C for two hours, placed in a dessicator to cool and then weighed to determine the total lipid extracted. This same sample was then titrated for total fatty acids by dissolving the residue in petroleum ether (10 ml), adding 95 percent ethanol, containing 0.001 percent thymol blue indicator (10 ml) and titrating the solution with 0.1 N potassium hydroxide in isobutyl alcohol. Additional aliquots were taken from the upper phase of the extraction mixture for the determination of trialkyl glyceryl ether.

The ether was determined as follows:

Since tridodecyl glyceryl ether is lipid-soluble, an aliquot of the lipid extract was used for the determination of the triether. Quantitation was made possible by using 1,2-didodecyl, 3-tetradecyl glyceryl ether as an internal standard. Samples containing the two triethers were applied to thinlayer plates coated with silica gel G. The plates were developed with hexane: diethyl ether (9:1) and the bands were visualized by spraying with dichlorofluorescein and viewing them under ultraviolet light. The triethers were extracted from the silica gel with chloroform which was evaporated before dissolving them in carbon disulfide for injection onto the gas chromatograph columns. The glass columns, 100 cm by 4 mm, were packed with 1% Silicone OV-25 on Chromosorb G. The column temperature was held at 290° with the injector and detector ports at 300°C. The instrument was equipped with dual hydrogen flame ionization detectors. The gas flow rates were: 35, 30 and 300 ml per minute for nitrogen, hydrogen and air, respectively.

The fatty acids were determined as follows:

An aliquot of the fat extract for esterification, containing approximately 1 mg of lipid, was transferred to a 16 × 150 mm screw-capped tube and 0.2 mg of behenic acid was added as an internal standard. The solvent was removed under reduced pressure on a rotary evaporator using a nitrogen sweep. Ten drops of benzene and 2 ml of 14 percent boron trifluoride in methanol were added and the sealed tubes heated to 70°C for 1½ hours. After cooling to room temperature, 4 ml of water was added and the fatty acid esters were extracted with three successive portions of petroleum ether. The petroleum ether was evaporated in a stream of nitrogen and the residue was transferred to a thin-layer plate coated with silica gel G. The plates were then developed with benzene and dichlorofluorescein was used to visualize the fatty acid ester band. The band was scraped off and extracted with chloroform, the solvent removed in a stream of nitrogen and the residue dissolved in 100$\mu$l of carbon disulfide. A suitable volume (2$\mu$l) was analyzed by gas chromatography. The stainless steel columns, 150 cm × 2 mm I.D., were packed with 15 percent ethylene glycol succinate on 80–100 mesh Gas-Chrom P. The oven temperature was programmed from 160° to 200°C at 4° per minute. The injector and detector ports were maintained at 180° and 220°C, respectively. The instrument was equipped with dual flame ionization detectors. The gas flow rates were: 35, 30 and 300 ml per minute for nitrogen, hydrogen and air, respectively.

The chromic oxide was determined as follows:

Samples of feed and feces were weighed out and digested according to Czarnocki et al., (1961) Can. J. Animal Sci. 41 167 to 169. Chromic oxide was then estimated by measuring the amount of chromium by atomic absorption (Arthur 1969 16th Spectroscopy Symposium of Canada). To determine the amount of chromic oxide in the residue from digesta samples left after lipid extraction, the remaining extraction solvents were evaporated on a steam bath and then the dry residue was digested and the amount of chromium was determined as for the feed and fecal samples.

It will be readily seen from the Examples that the ether is non-absorbable, and is recovered at least as completely as chromic oxide. Further, it will be seen that tridodecyl glyceryl ether remains in association with the dietary fat and passes from the stomach at the same rate as the fat. Further, tridodecyl glyceryl ether may be considered to be non-toxic since there is no difference between the feed intake, body weight gain or determination of dry matter and fat digestibility. There were also no differences between digestibility coefficient between groups of animals receiving the triether control group and therefore the ether has no significant effect on digestion or absorption. The tridodecyl glyceryl ether was recovered intact from fecal collection and this confirmed that the ether is stable to digestive and microfloral enzymes. Finally, as aforsaid the tridodecyl glyceryl ether is readily and easily quantitated.

Thus, tridodecyl glyceryl ether may be used in the detection and study of digestive malfunctions such as steatorrhea and while this lipid soluble digestibility indicator does not offer any significant advantages over conventional indicators such as chromic oxide, when fecal collections are used to determine the digestibility of the fat; however, when samples are withdrawn from within the digestive tract the ideal properties of the triether as a fat absorption indicator offers considerable promise by allowing these studies to be made quantitative. The use of the triether in intubation studies in man yields more accurate quantitative data. The measurement of the rate of lipolysis, the rate of absorption, the endogenous dilution and transit time are all facilitated by the use of the lipid soluble absorption indicator in conjunction with label fat and intubation. Tridodecyl glyceryl ether has a useful function in lipid absorption studies with laboratory and domestic animals where samples of digesta may be obtained by fistulation or by sacrifice. The lipid soluble indicator allows quantitative measurement of fat digestion absorption flow of lipids in the digestive tract and endogenous contributions under different physiological states and dietary regimens.

The embodiments of the invention in which an exclusive property or privilege is claimed are defined as follows:

1. A dietary feed composition for use in determining fat absorption during its passage through the digestive tract of an animal body, said composition containing a fat and an effective amount of tridodecylglyceryl ether as an absorption indicator present in an amount up to about 5% by weight of the fat in said feed composition.

2. The composition of claim 1 in which the ether is present in an amount up to 1% by weight of fat.

3. In the determination of the fat absorption of at least a portion of the digestive tract of an animal which comprises feeding to the animal a dietary feed composition containing a fat and a fat absorption indicator and determining the residual fat content of the feed from that portion of the digestive tract, the improvement in which the indicator administered or employed is tridodecylglyceryl ether present in said feed composition in an amount up to about 5% by weight of fat.

4. The method of claim 3 in which the residual fat content of the feces is determined. the indicator 5. The method of claim 3 in which the residual fat content of the ingestor from the stomach, jejunum, ileum or colon is determined.

6. The method of claim 3 in which the ether is present in an amount up to 1% by weight of fat.

7. The method of claim 3 in which the animal is a human.

8. The method of claim 3 in which the animal is a non-human mammal.

9. The method of claim 3 in which the animal is an avian.

* * * * *